US009571535B2

(12) United States Patent
Assem Aly Salama et al.

(10) Patent No.: US 9,571,535 B2
(45) Date of Patent: Feb. 14, 2017

(54) QUALITY OF EXPERIENCE FOR COMMUNICATION SESSIONS

(71) Applicant: International Business Machines Corporation, Armonk, NY (US)

(72) Inventors: Hitham Ahmed Assem Aly Salama, Blanchardstown (IE); Alfredo del Campo del Corral, Dublin (IE); Carlos Martin-Nieto Gonzalez, Ashtown (IE); Luis Pinto, Dublin (IE); Nirmala Venkatraman, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 14/302,661

(22) Filed: Jun. 12, 2014

(65) Prior Publication Data

US 2015/0365452 A1    Dec. 17, 2015

(51) Int. Cl.
 *G06F 15/16*  (2006.01)
 *H04L 29/06*  (2006.01)

(52) U.S. Cl.
 CPC ........... *H04L 65/403* (2013.01); *H04L 65/602* (2013.01); *H04L 65/80* (2013.01)

(58) Field of Classification Search
 CPC ....... H04L 65/403; H04L 65/602; H04L 65/80
 See application file for complete search history.

(56) References Cited

U.S. PATENT DOCUMENTS

| 8,243,117 B2 | 8/2012 | Ali et al. |
| 9,253,229 B1* | 2/2016 | Strothmann ........ H04L 65/4069 |
| 2006/0152394 A1* | 7/2006 | Lin ...................... H04N 19/129 |
| | | 341/67 |
| 2009/0309977 A1 | 12/2009 | Gevrekci et al. |

FOREIGN PATENT DOCUMENTS

| EP | 1936996 A2 | 6/2008 |
| WO | 9631984 | 10/1996 |
| WO | 2004002169 A1 | 12/2003 |
| WO | 2007087640 A2 | 8/2007 |

OTHER PUBLICATIONS

IBM List of Patents or Patent Applications to be Treated as Related (for Examiner Information only) dated Mar. 23, 2015, pp. 1-2.
Luca de Cicco, et al., "Skype Video Responsiveness to Bandwidth Variations," Proceedings of the International Workshop on Network and Operating System Support for Digital Audio and Video, p. 81-86, 2008, Proceedings of the 18th International Workshop on Network and Operating Systems Support for Digital Audio and Video, NOSSDAV 2008, pp. 81-86.

* cited by examiner

*Primary Examiner* — Brian P Whipple
(74) *Attorney, Agent, or Firm* — Brian J. Colandreo, Esq.; Jeffrey T. Placker, Esq.; Holland & Knight LLP (57) ABSTRACT

A computer-implemented method, computer program product, and computing system is provided for managing quality of experience for communication sessions. In an implementation, a method may include determining a change in an optimum video size for a streaming video. The method may also include determining one or more constraints of resizing (Continued)

associated with the change in the desired video size. The method may further include adaptively resizing the streaming video to a current desired video size when the one or more constraints of resizing exceed a threshold value.

11 Claims, 9 Drawing Sheets

QUALITY OF EXPERIENCE FOR COMMUNICATION SESSIONS

TECHNICAL FIELD

The present disclosure generally relates to systems and method for electronic communications, and more particularly relates to managing quality of experience for electronic communication sessions.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, engage in common work projects, for example, using online team work spaces, participate in interactive discussions, for example, using teleconferencing or video conferencing systems, and engage in meetings, for example, using electronic meeting systems that allow for presentations, lectures, seminars, and the like.

SUMMARY OF DISCLOSURE

According to an implementation, a computer-implemented method may include determining, by a processor, a change in a desired video size for a streaming video. The method may also include determining one or more constraints of resizing associated with the change in the desired video size. The method may further include adaptively resizing the streaming video to a current desired video size when the one or more constraints of resizing exceed a threshold value.

One or more of the following features may be included. Determining the change in the desired video size for the streaming video may include determining a desired video size for the streaming video. Determining the change in the desired video size for the streaming video may also include determining a current size for the streaming video. The desired video size for the streaming video may be based upon, at least in part, one or more network conditions associated with the streaming video. The desired video size for the streaming video may be based upon, at least in part, one or more device attributes associated with a consumption device for the streaming video.

The one or more constraints of resizing may include a perceived value gain of resizing the video. The one or more constraints of resizing may include a time since last resizing of the streaming video. Adaptively resizing the streaming video to a current desired video size may include delivering the streaming video in the current desired video size to at least one recipient of the streaming video.

According to another implementation, a computer program product may include a computer readable storage medium having a plurality of instructions stored on it. When executed by a processor, the instructions may cause the processor to perform operations including determining a change in an optimum video size for a streaming video. Instructions may also be included for determining one or more constraints of resizing associated with the change in the desired video size. Instructions may further be included for adaptively resizing the streaming video to a current desired video size when the one or more constraints of resizing exceed a threshold value.

One or more of the following features may be included. The instructions for determining the change in the desired video size for the streaming video may include instructions for determining a desired video size for the streaming video. The instructions for determining the change in the desired video size for the streaming video may include instructions for determining a current size for the streaming video. The desired video size for the streaming video may be based upon, at least in part, one or more network conditions associated with the streaming video. The desired video size for the streaming video may be based upon, at least in part, one or more device attributes associated with a consumption device for the streaming video.

The one or more constraints of resizing may include a perceived value gain of resizing the video. The one or more constraints of resizing include a time since last resizing of the streaming video. The instructions for adaptively resizing the streaming video to a current desired video size may include instructions for delivering the streaming video in the current desired video size to at least one recipient of the streaming video.

According to another implementation, a computing system may include a processor and a memory module coupled with the processor. The processor may be configured for determining a change in an optimum video size for a streaming video. The processor may also be configured for determining one or more constraints of resizing associated with the change in the desired video size. The processor may further be configured for adaptively resizing the streaming video to a current desired video size when the one or more constraints of resizing exceed a threshold value.

One or more of the following features may be included. The processor configured for determining the change in the desired video size for the streaming video may be further configured for determining a desired video size for the streaming video. The processor configured for determining the change in the desired video size for the streaming video may be further configured for determining a current size for the streaming video. The desired video size for the streaming video may be based upon, at least in part, one or more network conditions associated with the streaming video. The desired video size for the streaming video may be based upon, at least in part, one or more device attributes associated with a consumption device for the streaming video.

The one or more constraints of resizing may include a perceived value gain of resizing the video. The one or more constraints of resizing may include a time since last resizing of the streaming video.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Individuals may often engage in communication sessions, utilizing a data network for conveying the communications. Such communication sessions may include, for example, Voice-over-IP and Video-over-IP communications, in which the communications to and from each party may be conveyed as packetized data over a data network. Similarly, individual may view various types of streaming video content, such as streaming broadcast programming, video on demand programming, video content created by other users and distributed over a data network, and the like. The quality of these types of communications or video products can be greatly affected by network conditions. Network conditions which may impact the quality of the communication or video may include, but are not limited to, delay, packet loss, jitter, burst ratio may be important factors that may impact the perceived quality of experience of the individuals participating in a communication session. For example, as packet loss increases the quality of the communication, or video product, may be degraded, for example with the individuals experiencing broken or garbled video signals, increased interference and noise, artifacts, and the like. Changes in other network characteristics may similarly impact, either positively or negatively, the quality of experience perceived by the participants in a communication session.

In some situations, the video quality may be a significant component of a multimedia conference, or other streamed video content (e.g., which may be generally contemplated by the use of the term multimedia conference). In such situations, an unsatisfactory video quality may result in an unsatisfactory overall user quality of experience. In an embodiment, the present disclosure may provide adaptive resizing of video content to provide a satisfactory quality of experience and/or an improved quality of experience, for a multimedia conference. For example, due to changes in network conditions, codecs utilized for transmitting streaming video, or the like, the quality of the streaming video may change over the course of the multimedia conference. In an embodiment, as the quality of the video changes, the size of the video may be adaptively changed to provide a satisfactory video size for the available video quality. For example, in some instances a more satisfactory perceived quality of experience may be achieved by providing a relatively smaller video display size having a relatively higher quality, rather than providing a relatively larger video size having a relatively lower quality, as may be achieved by the same received video stream.

In an embodiment, a change in a desired video size may be determined for a streaming video. The desired video size may include, for example, a display size for the video that may provide a satisfactory (and/or most satisfactory) perceived quality of experience for a video for given network conditions (e.g., such as packet loss, jitter, delay, bit rate, codec utilized for transmitting the video, etc.). In an embodiment, the desired video size may be based upon, at least in part, subjective evaluations of quality of experience based on different video sizes and quality for different network conditions. In some embodiments, the subject evaluation of the quality of experience may be given as a qualitative metric, such as Mean Opinion Score ("MOS"). In some embodiments, the desired video size may also be based upon, at least in part, an anticipated viewing distance between a user viewing the video and the display on which the video is displayed. In some embodiments, the anticipated viewing distance may be based upon, at least in part, a type of device used for consuming the video (e.g., a mobile computing device, a desktop computing device, a laptop computing device, or a computing device having an associated large screen display). During the course of the multimedia conference, a change in network conditions may give rise to a change in the desired video size. For example, for as network conditions deteriorate, a desired video size that may provide the highest MOS (e.g., the highest perceived quality of experience) may be smaller than the current size of the video.

In an embodiment, one or more constrains associated with changing a size of the video may be determined. The constrains associated with changing a size of the video may, for example, consider the positive benefits of resizing the video (e.g., to achieve the desired video size that may provide a higher perceived quality of experience), against any negative impacts that may result from resizing the video. For example, a positive benefit of resizing the video may include providing a higher perceived quality of experience associated with the video, such as by providing a video having less noticeable distortion or fewer artifacts. However, if the desired video size is inconsequentially different from a current size of the video, then resizing may not yield a significant benefit. Further, resizing the video in such a situation may utilize computing and/or network resources for a relatively small gain in quality of experience. Additionally, if the video size is changed too frequently, the changes in the size of the video may become distracting to the viewer. Such a distraction may outweigh any gains afforded by the improved quality of the video.

In an embodiment, the video may be adaptively resized to a current desired video size when the one or more constraints of resizing exceed a threshold value. That is, for example, when the benefits of resizing the video are greater than the negative impact of resizing the video, the streaming video may be adaptively resized to be a currently desired size. The current desired size may be a size of the video that may provide the greatest quality of experience given the current network conditions associated with the video transmission. In some embodiments, the streaming video may be adaptively resized throughout the course of the multimedia conference, for example, as network conditions change, and as such adaptive resizing is determined to be desirable in consideration of the constraints of resizing. Various additional and/or alternative features may also be included, as will be discussed below in greater detail.

Figure 1:
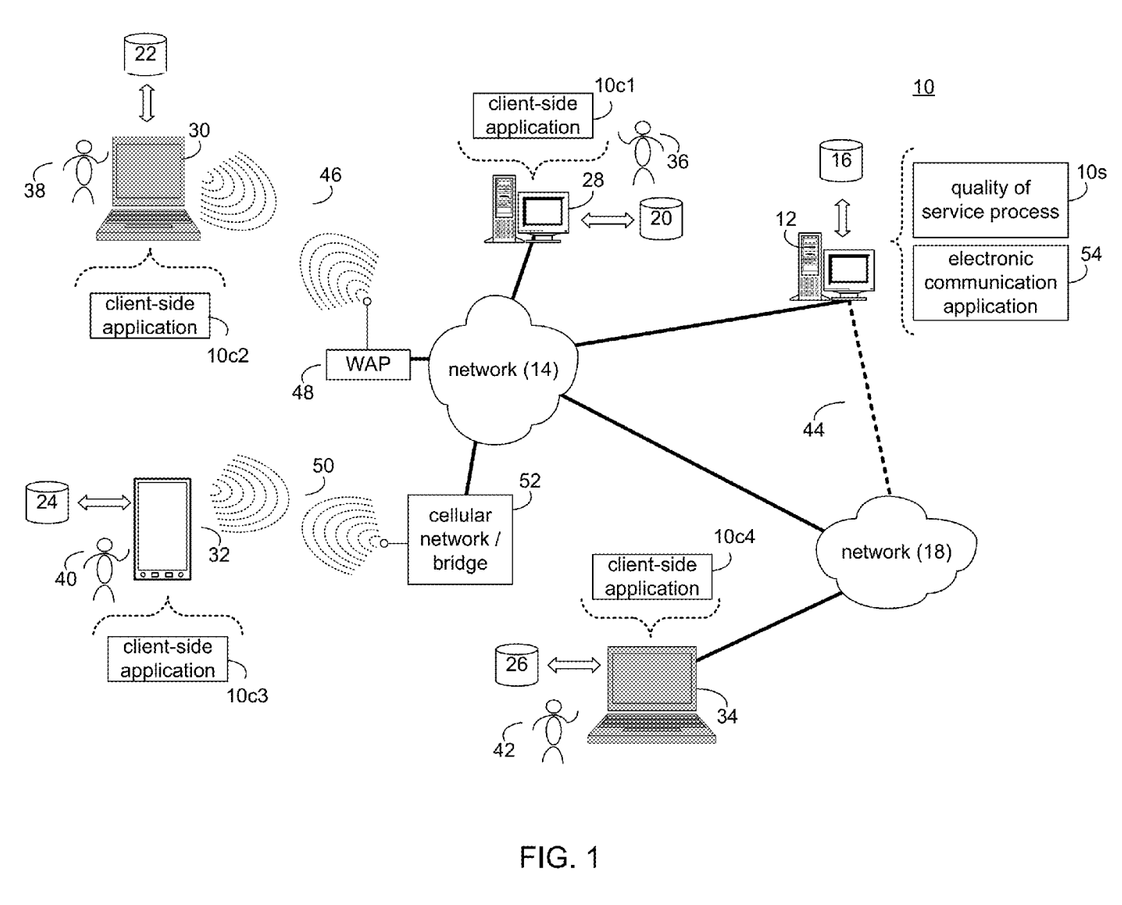
FIG. 1 is a diagrammatic view of a distributed computing network including a computing device that executes a quality of experience process according to an implementation of the present disclosure.

Referring to FIG. 1, there is shown quality of experience process 10. For the following discussion, it is intended to be understood that quality of experience process 10 may be implemented in a variety of ways. For example, quality of experience process 10 may be implemented as a server-side process, a client-side process, or a server-side/client-side process.

For example, quality of experience process 10 may be implemented as a purely server-side process via quality of experience process 10s. Alternatively, quality of experience process 10 may be implemented as a purely client-side process via one or more of client-side application 10c1, client-side application 10c2, client-side application 10c3, and client-side application 10c4. Alternatively still, quality of experience process 10 may be implemented as a server-side/client-side process via server-side quality of experience process 10s, in combination with one or more of client-side application 10c1, client-side application 10c2, client-side application 10c3, and client-side application 10c4. In such an example, at least a portion of the functionality of quality of experience process 10 may be performed by quality of experience process 10s, and at least a portion of the functionality of quality of experience process 10 may be performed by one or more of client-side application 10c1, 10c2, 10c3, and 10c3.

Accordingly, quality of experience process 10 as used in this disclosure may include any combination of quality of experience process 10s, client-side application 10c1, client-side application 10c2, client-side application 10c3, and client-side application 10c4.

Figure 2:
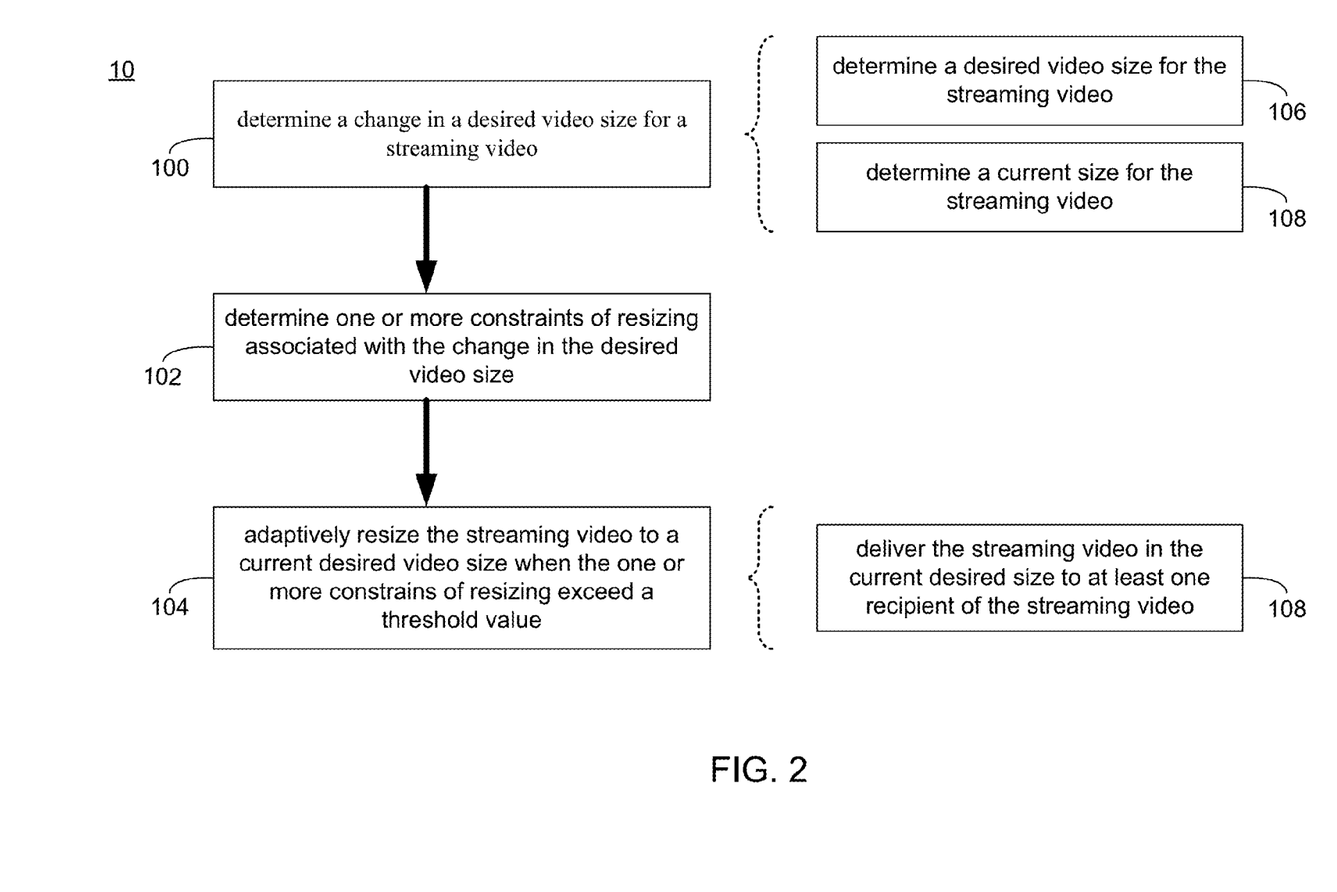
FIG. 2 is a flowchart of the quality of experience process of FIG. 1, according to an example embodiment of the present disclosure.

Referring also to FIG. 2, and as will be discussed in greater detail below, quality of experience process 10 may determine 100 a change in a desired video size for a streaming video. Quality of experience process 10 may also determine 102 one or more constraints of resizing associated with the change in the desired video size. Quality of experience process 10 may further adaptively resize 104 the streaming video to a current desired video size when the one or more constraints of resizing exceed a threshold value.

Quality of experience process 10s, may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of quality of experience process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a voice-over-IP application, a video-over-IP application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access quality of experience process 10 directly through network 14 or through secondary network 18. Further, quality of experience process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, quality of experience process 10 may communicate with, interact with, and/or include a component or module of a communication application (e.g., communication application 54). As is generally known, a communication application (e.g., communication application 54) may generally facilitate multimedia communications, such as video communications or conferences, between individuals as participants in a video conference. For example, communication application 54 may facilitate voice over IP and/or video over IP communications between video conference participants. In some embodiments, a video conference may only include two participants. In some embodiments, a video conference may include more than two participants. In some embodiments, communication application 54 may include, and/or may interact with, for example, an electronic meeting application, a web conferencing application, or a similar application. An example of communication application 54 may include, but is not limited to, Lotus® Sametime®. (Lotus and Sametime are registered trademarks of International Business Machine Corporation in the United States, other countries, or both). In some embodiments, communication application 54 may include a communication gateway and/or provide functionality of a communication gateway. In further embodiments, communication application may include a video distribution application that may, for example, provide streaming video for consumption by one or more recipients of the streaming video. In some examples, the streaming video may include streaming media products, user created content, commercially distributed video content, etc.

In an embodiment, the instruction sets and subroutines of electronic communication application 54 may be stored, e.g., on storage device 16 associated with server computer 12, which executes electronic communication application 54, and/or another suitable storage device. Further, users (e.g., one or more of users 36, 38, 40, 42) may access electronic communication application 54 in order to participate in an electronic video conference (such as a video call, an electronic meeting, or other video conference type). The users may access electronic communication application 54 via one or more suitable applications, such as client side applications 10c1-10c4 (e.g., which may include a video-over-IP application, a web browser, a client electronic meeting application, or another application) and/or via a different application (not shown). Additionally, while some users are depicted as being connected with server computer 12 (and therefore with electronic communication application 54) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of quality of experience process 10 may be provided by one or more of client side applications 10c1-10c4. For example, in some embodiments quality of experience process 10 (and/or client-side functionality of quality of experience process 10) may be included within and/or interact with client-side applications 10c1-10c4, which may include client side electronic communication applications, web browsers, or another application. Various additional/alternative configurations may be equally utilized.

As generally discussed above with reference to FIG. 2, quality of experience process 10 may determine 100 a change in a desired video size for a streaming video. Quality of experience process 10 may also determine 102 one or more constraints of resizing associated with the change in the desired video size. Quality of experience process 10 may further adaptively resize 104 the streaming video to a current desired video size when the one or more constraints of resizing exceed a threshold value.

Figure 3:
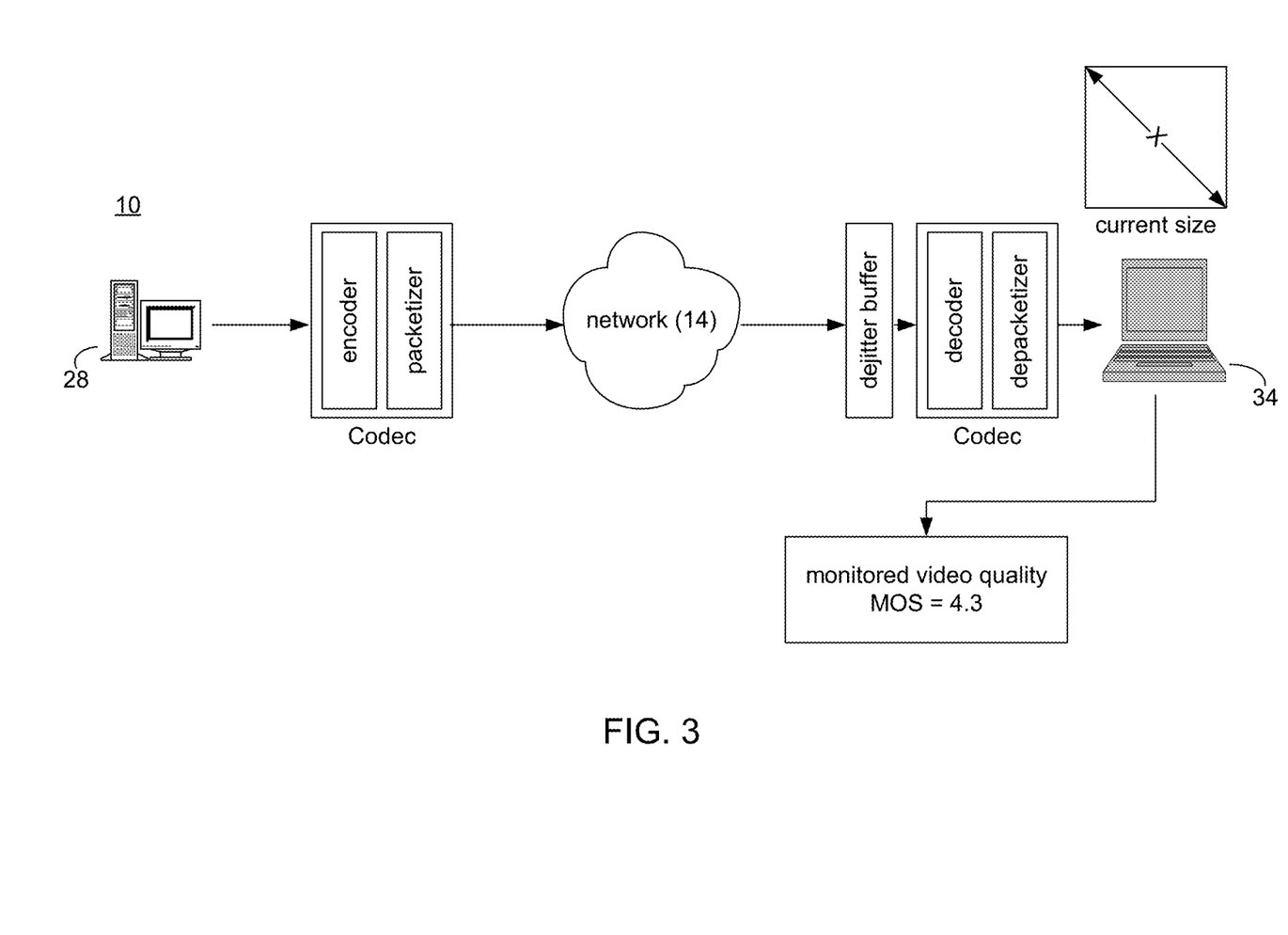
FIG. 3 diagrammatically depicts an implementation of the quality of experience process of claim 1, according to an example embodiment of the present disclosure.

For example, and referring to FIG. 3, a multimedia conference (such as a video conference) may be carried out between individuals (e.g., between user 36 and user 42 via respective computing devices 28, 34). During the course of the multimedia conference data may be shared between the participants in the multimedia conference, for example, including streaming video data, streaming audio data, as well as various additional and/or alternative data types. For the purpose of illustration, a video bit stream is shown transmitted by computing device 28 (e.g., which may be utilized by user 36) and received by computing device 34 (e.g., which may be utilized by user 42). The video bit stream may be encoded and packetized according to a suitable codec, and may similarly be decoded and depacketized by the recipient. Additionally, a dejitter buffer may be included (e.g., associated with a receiving computing device), e.g., to mitigate the effects of jitter and delay associated with network 14. It will be appreciated that video, audio, etc., may also be transmitted from computing device 34 to computing device 28. Further, while the example multimedia conference is shown having a generally peer-to-peer arrangement, the multimedia conference may similarly include a multiparty conference, e.g., which may include more than two participants and/or may utilize a centralized video distribution point (such as a Multi Control Unit, or the like). Additionally, while a multimedia conference will be described for illustrative purposes, it will be appreciated that the present disclosure may suitable be utilized in connection with any video transmissions over a data network, such as distribution of video on demand content, streaming distribution of user-created video content, and the like.

Quality of experience process 10 may determine 100 a change in a desired video size for a streaming video. The size for the streaming video may include a size of the video displayed on a computing device (e.g., computing device 34) receiving the streaming video. The size for the video may be denoted in terms of linear measure (e.g., length and width, or diagonal dimension in inches, millimeters, or the like), or displayed pixel count (e.g., either in length and width pixel dimensions or total pixel count of the displayed video). It will be appreciated that the size for the video may be otherwise denoted.

Determining 100 the change in the desired video size for the streaming video may include determining 106 a desired video size for the streaming video. The desired video size for the streaming video (e.g., the video component of the multimedia conference, in the illustrated example) may include a size for the streaming video which may provide a satisfactory quality of experience for an individual (e.g., user 42) viewing the streaming video on a computing device (e.g., computing device 34). In some embodiments, the desired video size for the streaming video may include an optimum size for the video, e.g., which may include a size for the video that may provide the highest perceived quality of experience for an individual viewing the streaming video. For example, in some instances a more satisfactory perceived quality of experience may be achieved by providing a relatively smaller video display size having a relatively higher quality. This may occur because, given the same available video resolution, a larger size may result in a greater degree of pixilation, noise, and/or presence of artifacts within the displayed video, which may make the video appear grainy, distorted, choppy, etc.

In an embodiment, the desired video size for the streaming video may be based upon, at least in part, one or more network conditions associated with the streaming video. For example, different network conditions may impact the resolution of the video that may be streamed at an acceptable quality. Examples of network conditions that may impact the desired size for the streaming video may include, for example, packet loss (including random and burst losses), jitter, bit rate, frames per second, and the codec used to encode and packetize the video bit stream. In an example embodiment, various different network conditions may be integrated in a single metric, e.g., which may be referred to herein as a Mean Opinion Score ("MOS"). The network conditions associated with the streaming video may be monitored and/or ascertained in any suitable manner. For example, the network conditions may be monitored via the Real Time Control Protocol ("RTCP").

The desired video size for the streaming video may be based upon, at least in part, one or more device attributes associated with a consumption device for the streaming video. For example, different consumption devices (e.g., devices on which the streaming video may be rendered for viewing by a user, such as computing device 34, which may render the streaming video for viewing by user 42) may typically have different associated average viewing distance, and/or display sizes. For example, a smart phone may typically be viewed from a relatively close distance (e.g., arms length distance or closer). Similarly, a desktop computing device may typically be positioned slightly further away from a user, and may therefore present an average viewing distance slightly greater than arms length. Further, in some situations, a video conference may be displayed through a large screen television or a projection device, e.g., for common viewing by multiple individuals in the same room, such as a conference room. Such a display device may typically have a much greater average viewing distance than a smart phone or a desktop computing device. It will be appreciated that various other computing device may also have associated average viewing distances. In an embodiment, the device attributes (such as the average displaying distance and/or the screen size) may be inferred from the device type. It will be appreciated that the average viewing distance between a user and a displayed video may impact the perceived quality of experience associated with a streaming video. For example, for the same video quality, a user may perceive a relatively higher quality of experience associated with a relatively larger video that is viewed from a greater distance than may be perceived by the same quality and size video that is viewed from a relatively closer distance.

In an example embodiment, a desired video size may be empirically determined as being a function of the MOS. In some embodiments, the desired video size may also be determined as being a function of the average viewing distance as well. In an embodiment, an experimentally determined function for desired size for a streaming video may include $$\text{Desired video size} = Fn(MOS) = A*(MOS)^3 + B*MOS^2 + C*MOS + D$$

in which A, B, C, and D may be codec specific variables and/or average viewing distance variables. Consistent with such an example, the desired video size for the streaming video may include a cubic function of the MOS. In other embodiments, the desired size for the streaming video may include a quadratic function of the MOS, and/or another function of the MOS. Various additional and/or alternative qualitative correlations between network conditions (e.g., MOS) and/or display device characteristics may be established and/or utilized for determining a desired size for the streaming video.

Figure 4:
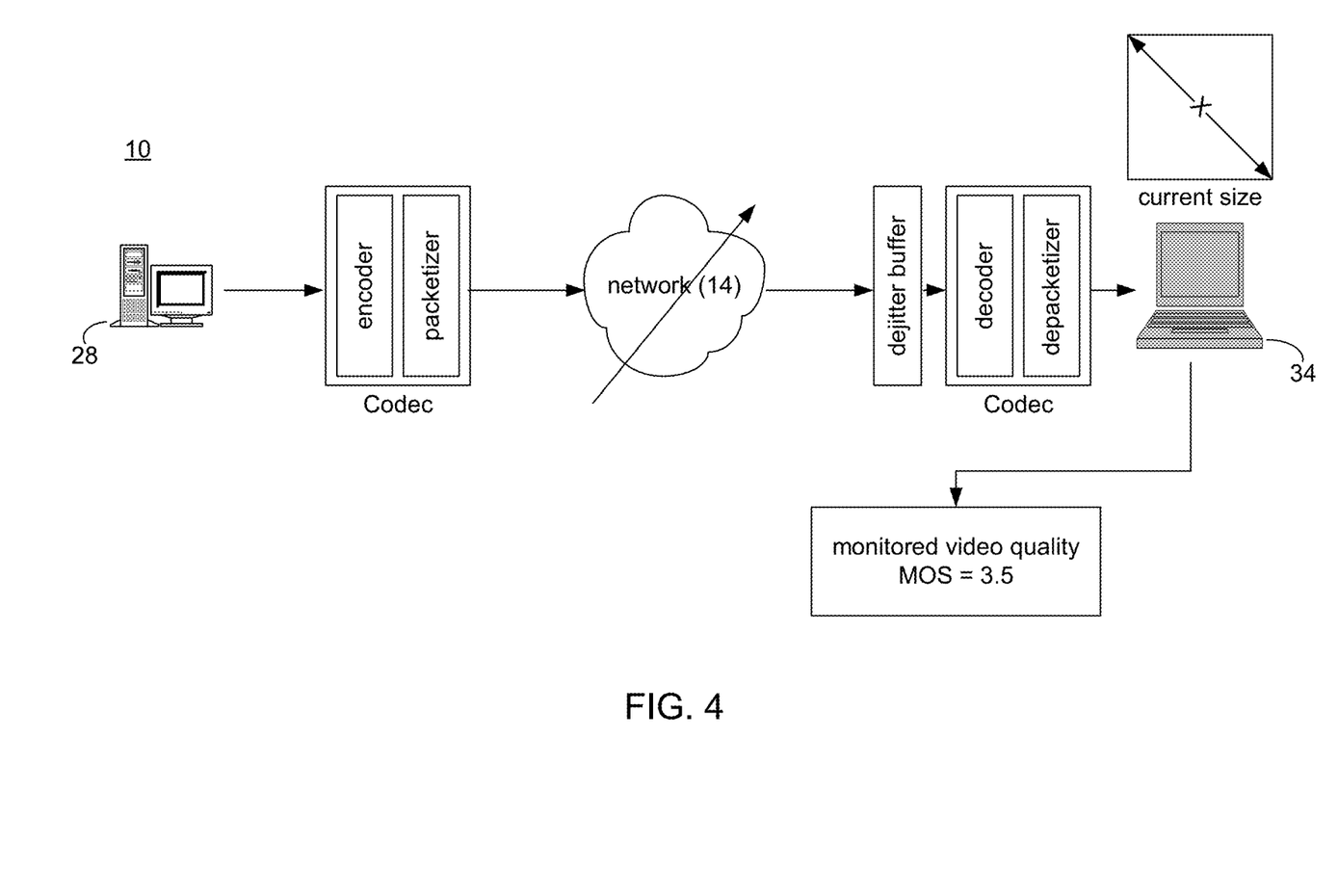
FIG. 4 diagrammatically depicts an implementation of the quality of experience process of claim 1, according to an example embodiment of the present disclosure.
Figure 5:
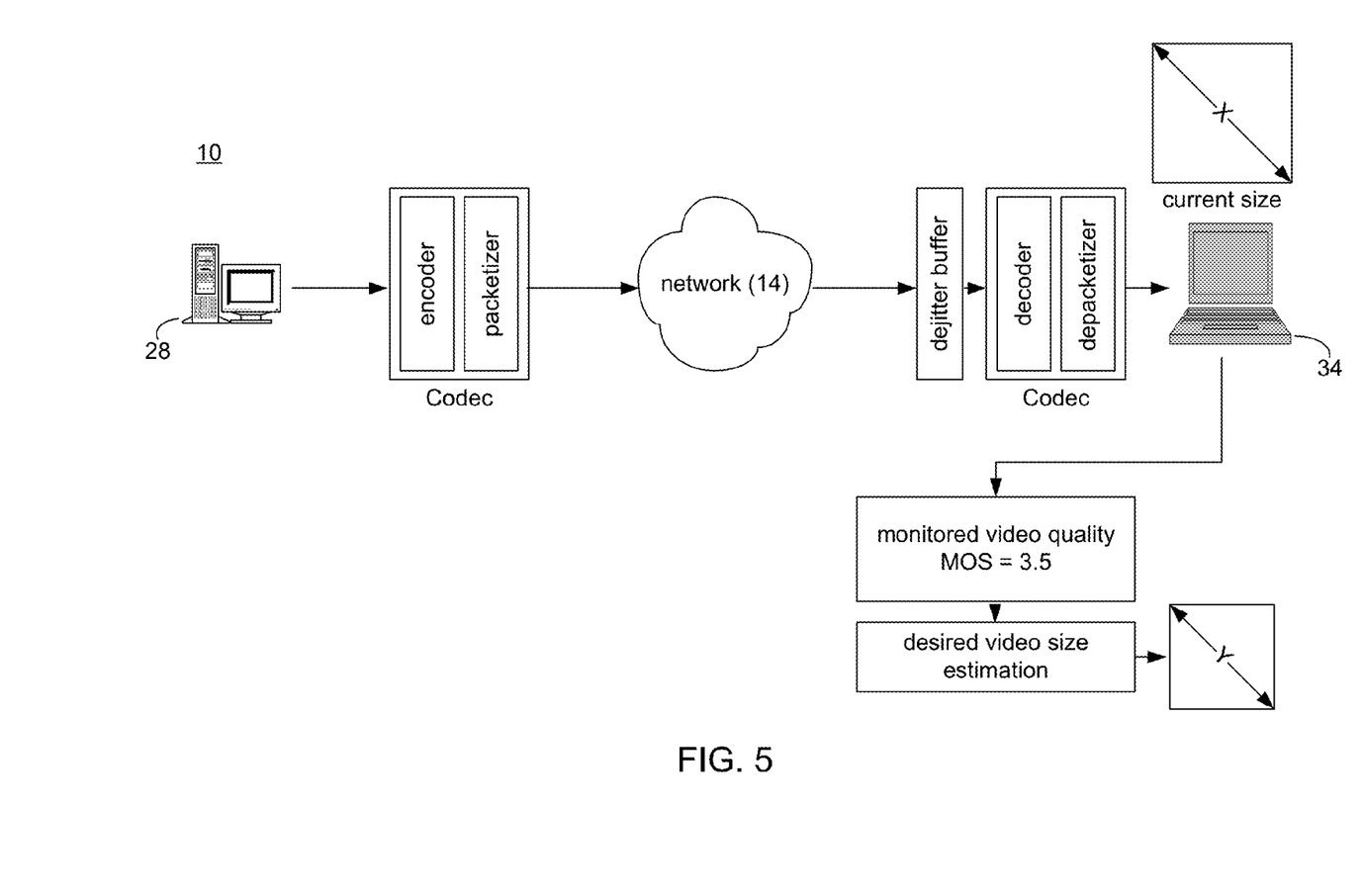
FIG. 5 diagrammatically depicts an implementation of the quality of experience process of claim 1, according to an example embodiment of the present disclosure.

As mentioned above, quality of experience process 10 may determine 100 a change in a desired video size for a streaming video. In an embodiment, determining 100 the change in a desired video size for the streaming video may be based upon, at least in part, determining a change in network conditions associated with the streaming video. For example, as shown in FIG. 3, initially relatively good network conditions may be associated with the streaming video of the multimedia conference, giving rise to an MOS of 4.3. However, and referring also to FIG. 4, during the course of the multimedia conference the network conditions associated with the multimedia conference may deteriorate, resulting in a decreased MOS of 3.5. Based upon, at least in part, the initial MOS of 4.3,, a first desired video size (e.g., video size "X" shown in FIG. 3) may have been initially determined 106. However, in response to the change in the network conditions, and the resultant decrease in the MOS to 3.5,, a second, or current, desired size for the video may be determined 106 (e.g., video size "Y" shown determined in FIG. 5). Accordingly, quality of experience process 10 may determine 100 a change in the desired size for the video (e.g., from size "X" to size "Y").

Determining 100 the change in the desired video size for the streaming video may also include determining 108 a current size for the streaming video. For example, as shown in FIG. 3, based upon, at least in part, the initially determined 106 desired size for the video, an initial current video size of "X" may have been established for the multimedia conference. Quality of experience process 10 may determine 108 the current size established for the streaming video of the multimedia conference, e.g., as being the size that the streaming video is currently being rendered at on computing device 34.

As described above, in an example embodiment, in response to the change in network conditions, and the decreased MOS of 3.5,, quality of experience process 10 may determine 100 a change in the desired size for the video (e.g., which may include determining 106 the desired size for the video after the change in the MOS to 3.5). Accordingly, in an embodiment, determining 100 the change in the desired size for the streaming video may include determining 108 the current size for the streaming video and determining that the current desired size (e.g., after the change in the MOS to 3.5) for the streaming video is less than the current size for the streaming video.

In addition to determining that the streaming video may have a changed desired size for the video (e.g., such that the desired size for the streaming video may be different than the size at which the streaming video is currently being displayed), quality of experience process 10 may also determine whether it may be desirable to change the size of the video. For example, in determining whether it may be desirable to change the size of the video being displayed, quality of experience process 10 may consider the benefits of changing the size of the video (e.g., the potential increase in the perceived quality of experience resulting from providing the video at the desired size for the video as compared the quality of experience associated with providing the video at a size other than the desired size) as well as the negative impacts of changing the size of the video (e.g., the potential decrease in the perceived quality of experience that may be caused by changing the size of the video).

Quality of experience process 10 may determine 102 one or more constraints of resizing associated with the change in the desired video size. As generally described above, the one or more constraints of resizing associated with the change in the desired video size (e.g., from an original size to a currently desired size) may provide a focus on a real human perception of the video quality and overall quality of experience, which may differ from an objective measure of the quality for the desired video size. That is, the benefits of changing the size of the video, from a perceived quality of experience perspective, may be balanced against any negative impacts on the perceived quality of experience as a result of resizing the video.

Figure 6:
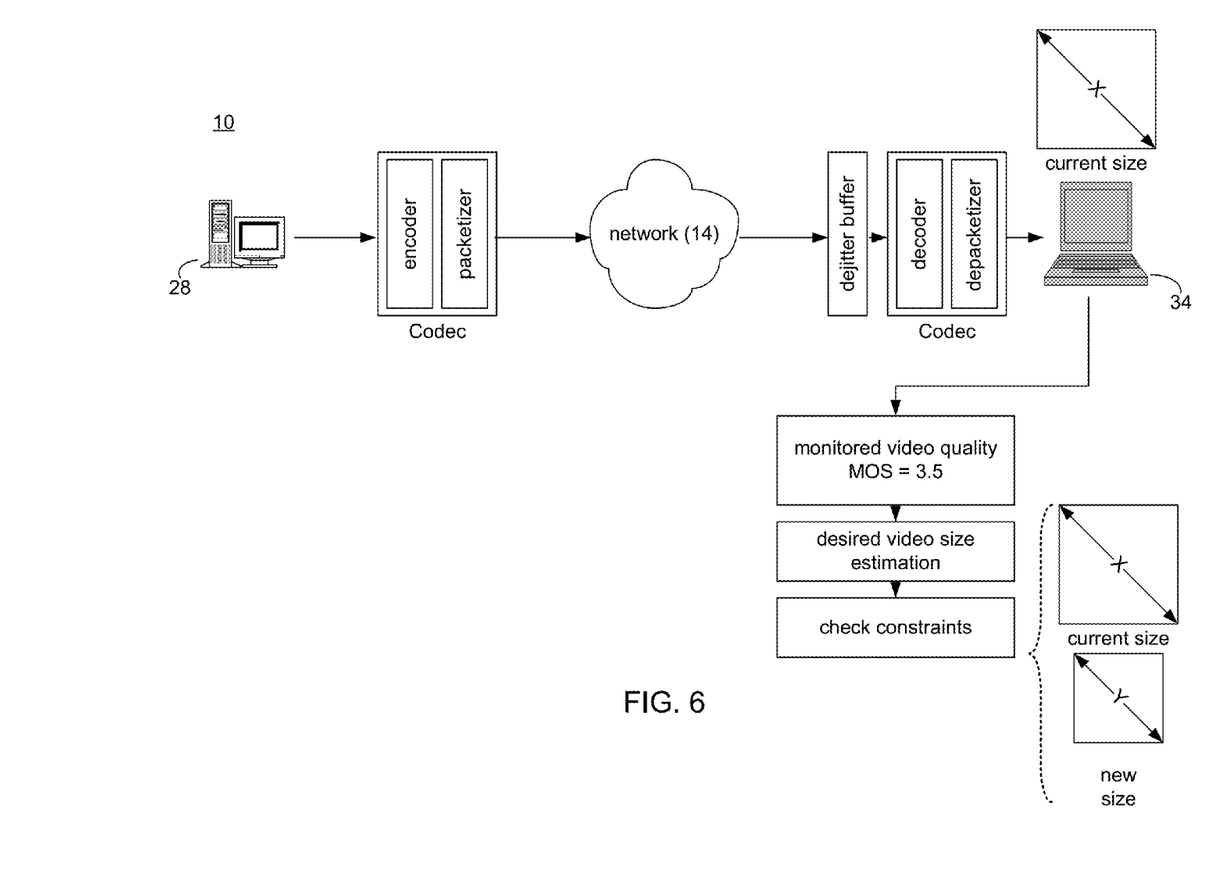
FIG. 6 diagrammatically depicts an implementation of the quality of experience process of claim 1, according to an example embodiment of the present disclosure.

The one or more constraints of resizing may include a perceived value gain of resizing the video. For example, and referring also to FIG. 6, quality of experience process 10 may compare the current size of the video to the determined 106 desired size of the video. Impart, comparing the current size of the video to the determined desired size may evaluate whether the difference between the current size and the desired size is significant enough that it may have a beneficial positive impact on the perceived quality of experience associated with the multimedia conference. In the illustrated embodiment, the current size (e.g., having a size "X") may be significantly different than the desired size (having a size "Y"). Accordingly, a change in the size of the video may have a significant impact on the perceived quality of experience associated with the multimedia conference. For example, the network conditions may have deteriorated to the extent that the video at size "X" may be significantly impacted by lost packets, etc., and therefore a decrease in the size of the video to size "Y" may represent a significant change that may beneficially improve the perceived quality of experience. In other circumstances, the change in the video size between the current video size and the desired video size may represent such a small change that the change may have a comparatively insignificant impact on the perceived quality of experience. Different threshold size difference values (e.g., which may be represented as a percent change in size, or any other suitable measure of size difference) may be utilized for indicating the significance that a size change may have relative to the perceived quality of experience. Such thresholds may be based upon, at least in part, design criteria, user preference, or the like.

The one or more constraints of resizing may include a time since last resizing of the streaming video. For example, the time since the last resizing of the streaming video may consider a negative impact of resizing the video. For example, if the video is resized frequently, with relatively short time spans between resizing, the resizing of the video may become distracting, or otherwise decrease the perceived quality of experience. In some situations, the distraction or decrease in perceived quality of experience due to the resizing, may be greater than an anticipated increase in quality of experience resulting from providing the video at the desired size. As such, the balance of the decrease in quality of experience from the frequent resizing and the increase in quality of experience from providing the video at the desired size may result in an overall decrease in the perceived quality of experience associated with the multimedia conference. Various time thresholds since the last resizing of the video may be implemented for defining the relative impact on the perceived quality of experience associated with the multimedia conference resulting from resizing the video. The threshold may be based on, at last in part, design criteria, user preference, or the like. In addition/as an alternative to being based solely on the time since the last resizing, a metric of a negative constraint on resizing may contemplate the relative size difference between the current video size and the desired video size.

Various additional and/or alternative constraints, both positive and negative, on resizing of the video may be utilized in connection with determining the impact of resizing the video on the overall quality of experience associated with the multimedia conference. Additionally, various threshold values may be associated with each constraint. The values associated with the constraints may be considered individually and/or may be combined into a composite value. For example, in the case of a composite value, a composite value above a determined threshold may indicate an overall increase in the perceived quality of experience associated with the multimedia conference due to a change in the size of the video, while a value below the threshold may indicate an overall decrease in the perceived quality of experience associated with the multimedia conference due to a change in the size of the video. In an embodiment, the values associated with one or more of the constraints may be weighted relative to one or more other constraints. In such an embodiment, the more highly weighted constraints may have a greater impact on a determination of the impact of resizing on the overall quality of experience associated with the multimedia conference.

Figure 7:
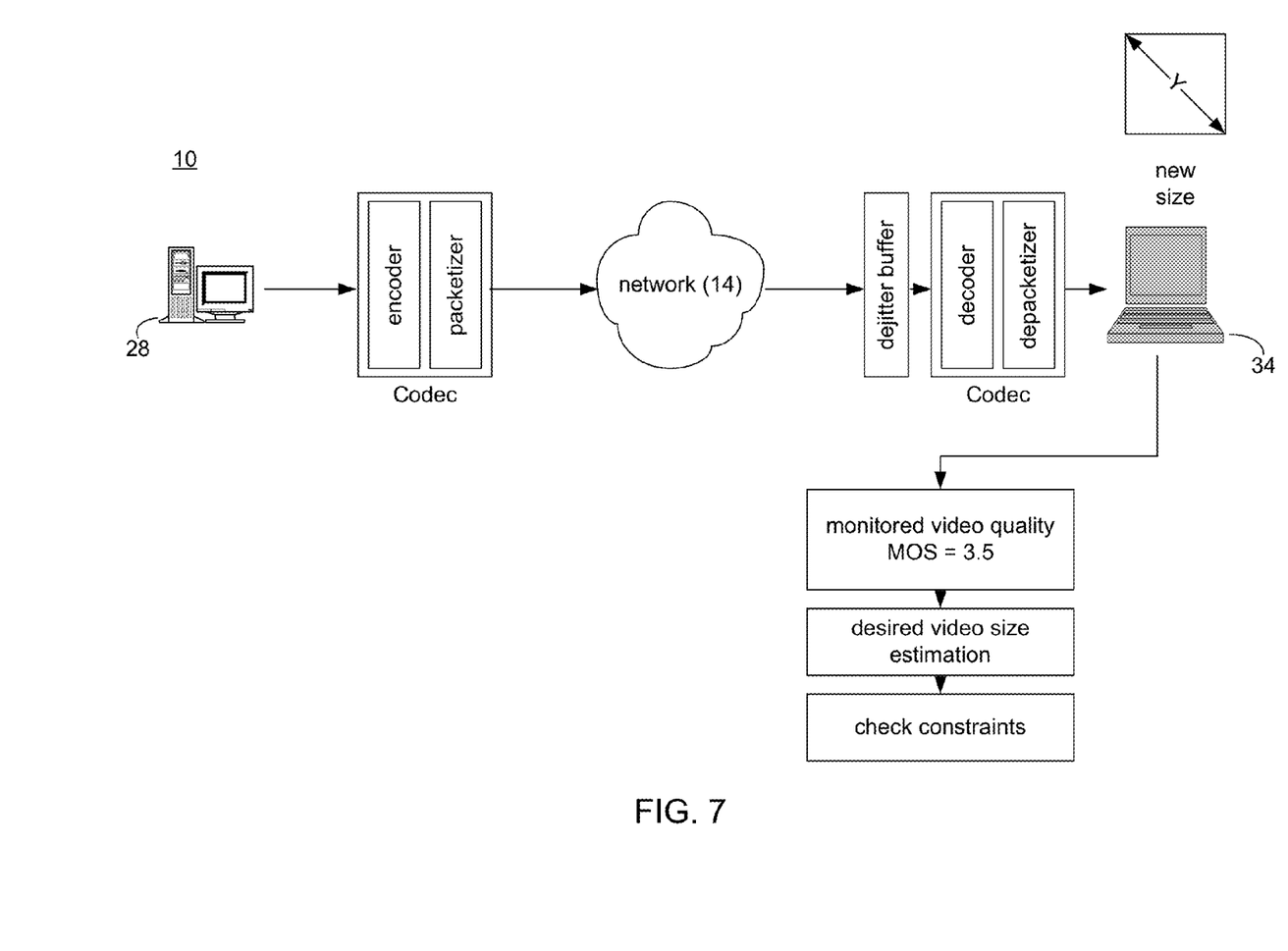
FIG. 7 diagrammatically depicts an implementation of the quality of experience process of claim 1, according to an example embodiment of the present disclosure.

Quality of experience process 10 may adaptively resize 104 the streaming video to a current desired video size when the one or more constraints of resizing exceed a threshold value. For example, and referring also to FIG. 7, when the constraints on resizing the video indicate that resizing the video may result in an overall increase in the perceived quality of experience associate with the multimedia conference (e.g., the benefit of resizing the video overweight the negative impacts of resizing the video), quality of experience process 10 may adaptively resize 104 the streaming video. Once resized 104, the streaming video may have a size corresponding to the determined 106 desired size for the video (e.g., a size of "Y" in the illustrated example). As generally discussed above, quality of experience process 10 may resize 104 the video one, or many, times throughout the multimedia conference, e.g., whenever the constraints of resizing the video exceed a threshold value. As such, quality of experience process 10 may adaptively resize 104 the video on a continuous and/or intermittent basis, e.g., depending upon whether the constraints exceed the threshold value for providing an overall increase in the perceived quality of experience of the multimedia conference. In a corresponding manner, and as generally discussed, quality of experience process 10 may not resize the video when the constraints of resizing do not exceed the threshold value, indicating that resizing the video may result in a decrease in the overall perceived quality of experience associated with the multimedia conference.

In an embodiment, adaptively resizing 104 the streaming video to a current desired video size may include delivering 110 the streaming video in the current desired video size to at least one recipient of the streaming video. For example, based upon, at least in part, determining that the constraints of resizing exceed the threshold value, quality of experience process 10 may instruct the transmitter of the streaming video (e.g., computing device 28 in the illustrated example) to transmit the video at the desired size. Transmitting the video at the desired size, in consideration of the prevailing network conditions, may result in the video being delivered to the recipient (e.g., computing device 34) at the desired size, and correspondingly providing a satisfactory quality of experience (and/or a highest achievable quality of experience).

Figure 8:
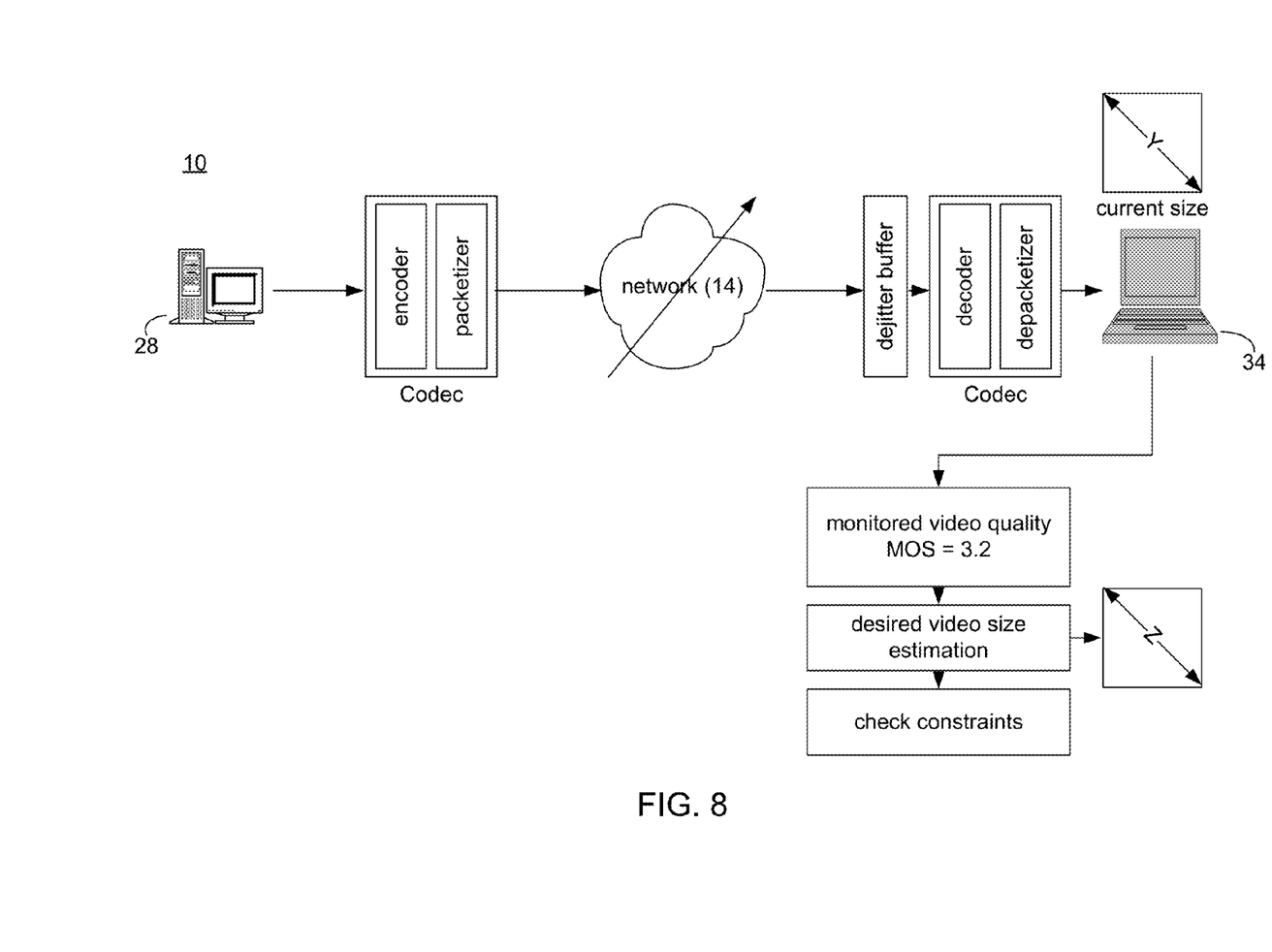
FIG. 8 diagrammatically depicts an implementation of the quality of experience process of claim 1, according to an example embodiment of the present disclosure.

As further illustration of the constraints of resizing, and referring also to FIG. 8, at a further point in time, the network characteristics may change still further. The changed network characteristics may result in a decrease in the MOS from 3.5, to 3.2. Quality of experience process 10 may determine 106 a desired video size of "Z" associated with the MOS of 3.2,, which may be different than the current video size of "Y." In the illustrated embodiment, the difference between the video size of "Z" and the video size of "Y" may be relatively minor. As such, a change in the video size from size "Y" to size "Z" may result in a relatively minor, or insignificant, change in the perceived quality of experience associated with the multimedia conference. Therefore, even in the absence of any negative constraints of resizing, the benefit of resizing the video may be small enough as to be less than the threshold for resizing the video. In such an embodiment, the video may not be resized, but rather may continue to be transmitted at the current size "Y."

Figure 9:
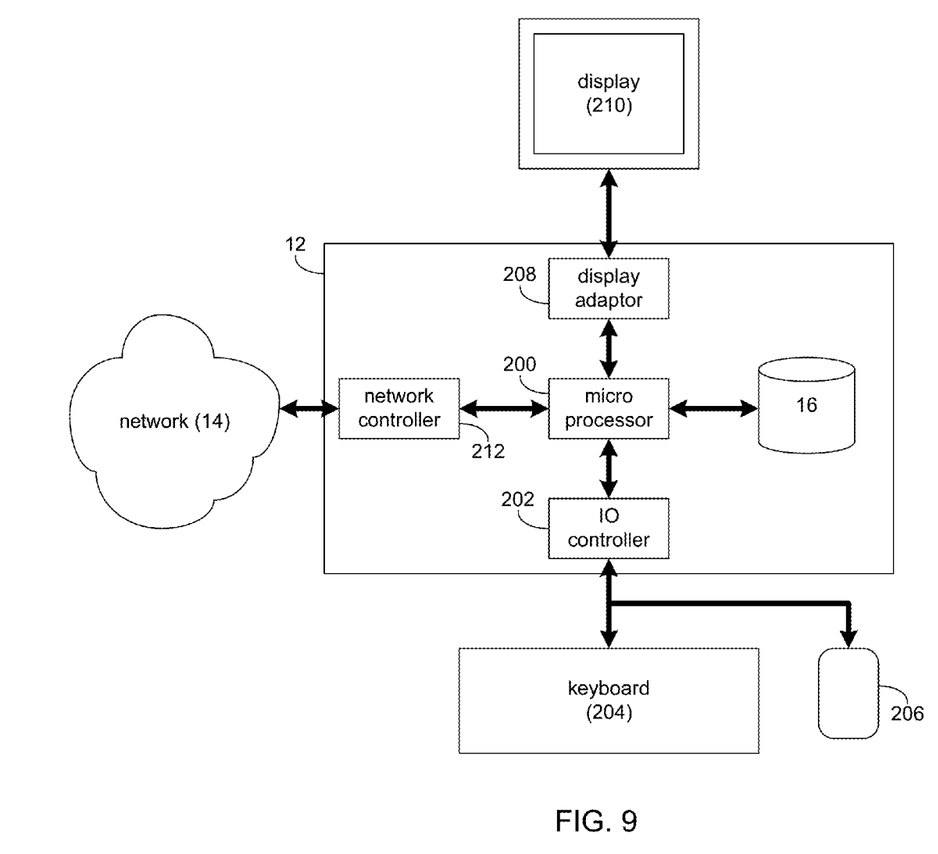
FIG. 9 diagrammatically depicts a computing device that may execute, in whole or in part, the quality of experience process of FIG. 1, according to an example embodiment.

Referring also to FIG. 9, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of experience process 10 may be substituted for computing device 12 within FIG. 9, examples of which may include but are not limited to client electronic devices 28, 30, 32, 34.

Computing system 12 may include microprocessor 200 configured to e.g., process data and execute instructions/code for quality of experience process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer program product comprising a computer readable storage medium having a plurality of instructions stored thereon, which, when executed by a processor, cause the processor to perform operations including:
   determining a change in a desired video size for a streaming video;
   determining one or more constraints of resizing associated with the change in the desired video size, wherein the one or more constraints of resizing include a time since last resizing of the streaming video; and
   adaptively resizing the streaming video to a current desired video size when the one or more constraints of resizing exceed a threshold value.

2. The computer program product of claim 1, wherein the instructions for determining the change in the desired video size for the streaming video include instructions for:
   determining a desired video size for the streaming video; and
   determining a current size for the streaming video.

3. The computer program product of claim 2, wherein the desired video size for the streaming video is based upon, at least in part, one or more network conditions associated with the streaming video.

4. The computer program product of claim 2, wherein the desired video size for the streaming video is based upon, at least in part, one or more device attributes associated with a consumption device for the streaming video.

5. The computer program product of claim 1, wherein the one or more constraints of resizing includes a perceived value gain of resizing the video.

6. The computer program product of claim 1, wherein the instructions for adaptively resizing the streaming video to a current desired video size include instructions for delivering the streaming video in the current desired video size to at least one recipient of the streaming video.

7. A computing system comprising:
   a processor and a memory module coupled with the processor, the processor being configured for:
   determining a change in a desired video size for a streaming video;
   determining one or more constraints of resizing associated with the change in the desired video size, wherein the one or more constraints of resizing include a time since last resizing of the streaming video; and
   adaptively resizing the streaming video to a current desired video size when the one or more constraints of resizing exceed a threshold value.

8. The computing system of claim 7, wherein the processor configured for determining the change in the desired video size for the streaming video is further configured for:
   determining a desired video size for the streaming video; and
   determining a current size for the streaming video.

9. The computing system of claim 8, wherein the desired video size for the streaming video is based upon, at least in part, one or more network conditions associated with the streaming video.

10. The computing system of claim 8, wherein the desired video size for the streaming video is based upon, at least in part, one or more device attributes associated with a consumption device for the streaming video.

11. The computing system of claim 7, wherein the one or more constraints of resizing includes a perceived value gain of resizing the video.

* * * * *